United States Patent
Essex et al.

[15] 3,700,039
[45] Oct. 24, 1972

[54] SPRING TRIP SHANK ASSEMBLY

[72] Inventors: Duane Arnold Essex, Des Moines; Virgil Dean Haverdink, Ankeny; Donald Allan Hill, Des Moines, all of Iowa

[73] Assignee: Deere & Company, Moline, Ill.

[22] Filed: March 3, 1971

[21] Appl. No.: 120,496

[52] U.S. Cl. .................. 172/265, 172/705, 306/1.5
[51] Int. Cl. ............................................. A01b 61/04
[58] Field of Search......172/261, 264, 265, 307, 484, 172/497, 500, 657, 705–707, 710

[56] References Cited

UNITED STATES PATENTS

| | | | |
|---|---|---|---|
| 2,625,869 | 1/1953 | Buhr | 172/497 |
| 444,986 | 1/1891 | Bloominger | 172/265 |
| 3,098,529 | 7/1963 | Wade et al | 172/710 |

FOREIGN PATENTS OR APPLICATIONS

| | | | |
|---|---|---|---|
| 1,129,076 | 1/1957 | France | 172/705 |
| 194,144 | 1/1907 | Germany | 172/705 |

Primary Examiner—Robert E. Pulfrey
Assistant Examiner—C. W. Hanor
Attorney—H. Vincent Harsha, Harold M. Knoth, William A. Murray, John M. Nolan and Raymond L. Hollister

[57] ABSTRACT

A self-restoring spring trip shank assembly in which the lever arm through which the spring acts to retain the shank in a working position decreases as the spring force increases upon upward deflection of the shank so that the force needed to trip the shank remains close to constant or has only a slight increase with increased tripping height.

6 Claims, 2 Drawing Figures

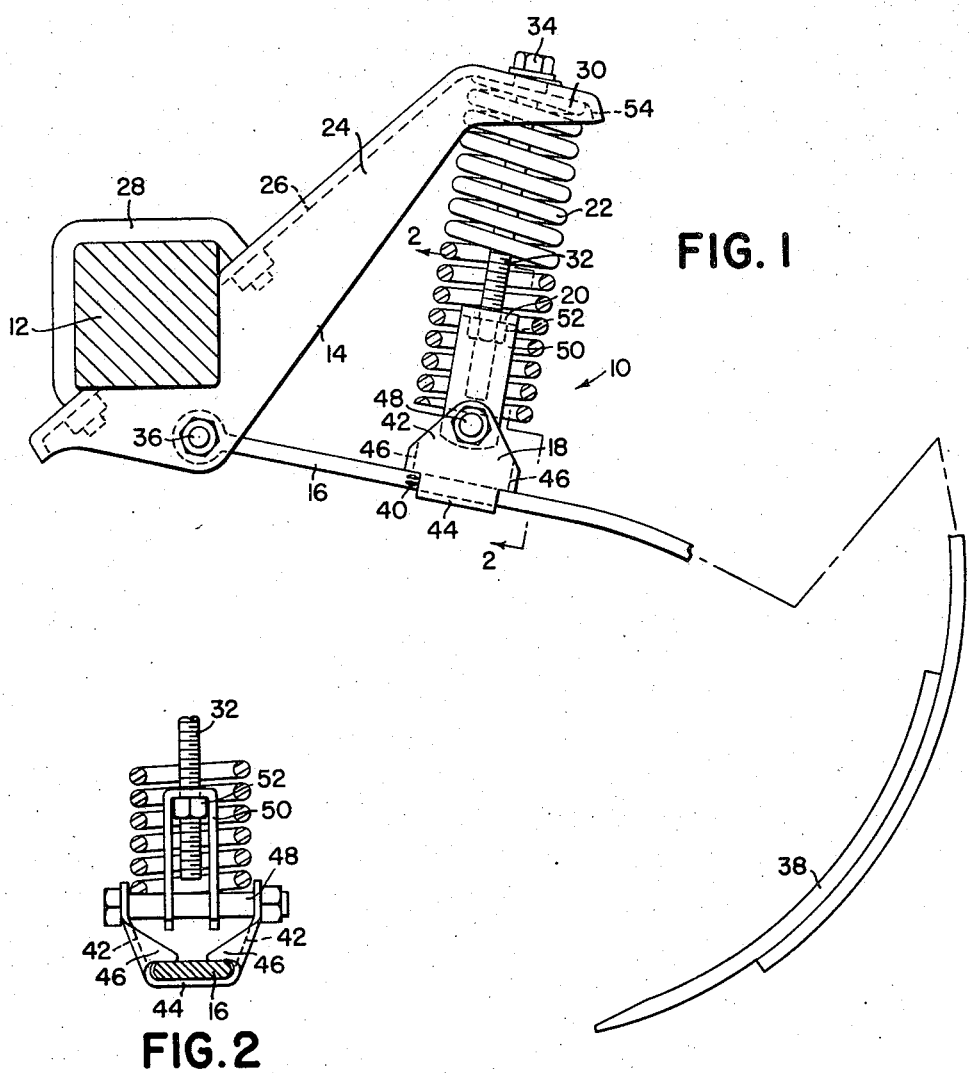

SPRING TRIP SHANK ASSEMBLY

BACKGROUND OF THE INVENTION

The present invention relates generally to ground-working agricultural implements, and more particularly relates to a self-restoring spring trip shank assembly such as that used on field cultivators and chisel plows.

In many ground-working agricultural implements, it is desirable to have the working tool spring loaded so it can be deflected upwardly over an immovable obstruction rather than be damaged by the obstruction, and, once the obstruction has been cleared, it is desirable to have the tool restore itself to its original position without stopping the implement. In such an implement, it is necessary that the loading spring have a sufficient force to hold the tool in the proper working position under normal ground conditions, but it is also desirable that the tool be capable of moving over an obstruction without a considerable increase in the spring force.

SUMMARY OF THE INVENTION

A general object of the present invention is to provide a simplified and improved self-restoring spring trip shank assembly for ground-working tools.

A more specific object of the present invention is to provide a self-restoring spring trip shank assembly in which the spring force holding the shank in the proper working position increases only slightly when the shank and associated ground-working tool move over an obstruction.

Another object of the present invention is to provide a self-restoring spring trip shank assembly for ground-working tools which has a decreasing moment arm of resistance which acts in cooperation with an increasing spring force so as to provide a substantially constant or only slightly increasing force on the tool as the tool moves over an obstruction.

Still another object of the invention is to provide a self-restoring spring trip shank assembly for earth-working tools in which the buckling forces on the spring are extremely small.

The above objects and additional objects and advantages will become apparent to those skilled in the art from a reading of the following detailed description of a preferred embodiment of the invention when taken in conjunction with the accompanying drawing.

BRIEF DESCRIPTION OF THE DRAWING

In the drawing:

FIG. 1 is a side elevation view of a spring trip shank assembly constructed in accordance with the principles of the present invention; and, FIG. 2 is a sectional view taken substantially along the line 2—2 of FIG. 1.

DESCRIPTION OF THE PREFERRED EMBODIMENT

Referring now to the drawing, the spring trip shank assembly indicated generally by the numeral 10 is illustrated as being mounted on a toolbar or support element 12 and consists essentially of a mounting element 14, a shank 16, a clamp 18, a tension link 20 and a spring 22.

The mounting element 14 is formed as a channel member having legs 24 and a bight 26. A portion of the bight of the channel member has been removed near one end and the adjoining portion of the legs have been notched to receive the lower rear corner of the toolbar 12. The mounting element is retained in position on the toolbar 12 by a U-bolt 28 which extends around the toolbar 12 and through apertures provided in the bight 26.

The mounting element extends upwardly and rearwardly from the toolbar to an upper rear end portion 30 which extends rearwardly and slightly downwardly. The bight 26 of the upper rear end portion 30 of the mounting element 14 is apertured to receive a threaded rod 32 forming part of the tension link 20. The head 34 of the rod 32 engages the upper surface of the bight 26 of the upper rear end portion 30 of the mounting element, and the lower surface of the bight of the upper rear end portion of the mounting element provides a spring-abutting surface for the coil spring 22.

The shank 16 is mounted between the legs 24 of the forward portion of the mounting element 14 for vertical pivotal movement by a pivot bolt 36 and extends generally rearwardly and downwardly therefrom to a curved portion which terminates in a forwardly directed earth-working tool 38. The shank 16 is provided with small protuberances 40 which serve as a guide for the proper positioning of the clamp 18.

The clamp 18 consists of a pair of generally triangular-shaped side walls 42 interconnected along their bottom edges by a web 44. The clamp 18 is positioned on the shank 16 with the web 44 engaging the bottom of the shank and the forward edge of the web engaging the protruberances 40. The lower corners 46 of the triangular-shaped side walls 42 of the clamp are bent inwardly to engage the upper surface of the shank 16. The side walls 42 are apertured near their upper corners to receive a clamp bolt 48 which, when tightened, holds the clamp 18 firmly in position on the shank 16. As can be seen from the drawing, the clamp 18, when properly positioned, provides a spring-abutting surface which is rearwardly of the pivot bolt 36, below the aperture provided in the upper rear end portion of the mounting element, slightly forwardly of a transverse vertical plane which extends through the aperture provided in the upper rear end portion of the mounting element 14, and rearwardly of a transverse plane perpendicular to the spring-abutting surface provided by the upper rear end portion of the mounting element.

In addition to securing the clamp 18 to the shank 16, the clamp bolt 48 also serves as an anchor for the lower end of the tension link 20 and as a lower abutment for the coil spring 22. The lower end of the tension link consists of an inverted U-shaped anchor member 50 having an apertured bight through which the lower end of the threaded rod 32 extends. The legs of the anchor member 50 are also apertured and mounted on the clamp bolt 48. A nut 52 threaded on the lower end of the rod 32 between the legs of the U-shaped anchor member serves to precompress the spring 22 which encircles the tension link and also serves to limit the lower position of the lower shank 18.

Since the lower end of the spring 22 bears against the clamp bolt 48, it is free to rock and therefore the lower end of the spring remains normal to the centerline or longitudinal axis of the spring and no buckling forces are exerted on the lower end of the spring. The upper end of the spring 22 bears against the lower surface of the bight 26 of the upper end of the mounting element. The legs 24 of the mounting element, a downwardly directed lip 54 on the extreme rear end of the mounting element, and the angle between the rear end portion and the major portion of the mounting element form a pocket for the upper end of the spring and retain the spring centered on the tension link. amount so as the point of abutment between the bottom of the spring 22 and the clamp bolt 48 is above a horizontal through the pivot bolt 36 so that upon upward deflection of the shank 16 the path of the point of abutment is upwardly and forwardly. The forward movement results in a decreasing lever or moment arm which cooperates with the increasing spring force to require a substantially constant or only slightly increasing force to move the shank upwardly.

In order to keep the buckling forces on the upper end of the spring at a minimum, the lower surface of the bight of the rear end portion of the mounting element faces forwardly a sufficient amount so that it is not normal to the centerline of the spring 22, but forms an acute angle therewith to the rear. However, during operation the shank will be deflected upwardly a small amount and move the lower end of the spring slightly forwardly so that the centerline of the spring is substantially normal to the surface of the bight of the upper rear end portion of the mounting element. If the tool 38 encounters an obstruction, the shank 16 will be deflected upwardly an additional amount and the lower end of the spring 22 will be moved further forward so that the centerline of the spring moves beyond the normal and forms an acute angle to the front with the lower surface of the bight of the upper rear portion of the mounting element. However, since the centerline of the spring and the lower surface of the bight of the upper rear end portion of the mounting element originally formed an acute angle to the rear, the acute angle to the front is sufficiently close to a right angle that the resultant buckling forces are insufficient to actually buckle the spring so the force-deflection curve for the assembly remains quite regular.

Although only a single embodiment of the invention has been described and illustrated, various modifications within the spirit and scope of the invention will be apparent to those skilled in the art and these obvious modifications can be made without departing from the underlying principles of the invention.

We claim:

1. A ground-working implement comprising: a support element; a mounting element having a lower forward end secured to the support element and extending upwardly and rearwardly to an upper rear end having an integral, apertured, plate with a downwardly and forwardly directed spring-abutting surface; a tool shank having a forward end pivotally connected to the lower forward end of the mounting element and extending rearwardly therefrom; clamp means secured to the shank rearwardly of the pivotal connection between the shank and mounting element and including a spring-abutting surface positioned below the apertured plate, above the pivotal connection between the shank and mounting element, forwardly of a transverse vertical plane passing through the center of the aperture provided in the plate, and rearwardly of a transverse plane perpendicular to the spring abutting surface of the apertured plate; tension link means having an enlarged upper end abutting against an upper surface on the apertured plate and extending downwardly through the aperture to a lower end secured to the clamp means; and a coil spring freely encircling the tension link means and compressed between the spring-abutting surface of the apertured plate and the spring-abutting surface of the clamp means, the parts being so arranged and constructed that upon upward deflection of the shank the effective lever arm through which the spring acts decreases as the spring force increases, and the centerline of the spring, when the spring is relaxed to the extent permitted by the tension link means, forms an acute angle to the rear with the plane of the spring-abutting face, and upon initial upward deflection of the shank due to normal working forces the centerline of the spring moves to a perpendicular with respect to the plane of the spring-abutting face, and upon additional upward deflection of the shank due to above normal working forces the centerline of the spring moves past the perpendicular to form an acute angle to the front with the plane of the spring-abutting face so that the maximum angle between the spring-abutting face and the centerline of the spring is kept at a minimum.

2. The implement set forth in claim 1 wherein the clamp means includes fulcrum means for effectively abutting the lower end of the coil spring, the fulcrum means permitting the lower end of the spring to remain normal to the centerline of the spring.

3. A ground-working implement comprising: a toolbar; a channel-shaped mounting element having a lower forward end secured to the toolbar and extending upwardly and rearwardly therefrom to an upper rear end; the bight portion of the channel facing upwardly and forwardly; the upper rear end of the mounting element being angularly disposed with respect to the major portion of the mounting element so as to extend generally rearwardly and having a guide rod receiving aperture in the bight portion thereof; a tool shank having a forward end pivotally mounted between the legs of the lower forward portion of the channel-shaped mounting element and extending rearwardly therefrom; clamp means secured to the shank rearwardly of the pivotal connection between the shank and mounting element and below and forwardly of the aperture in the upper rear end of the mounting element; tension link means having an enlarged upper end abutting against the top of the bight of the upper rear end of the mounting element and extending downwardly through the aperture to a lower end secured to the clamp means; and coil spring means encircling the tension link means and compressed between the clamp means and the lower side of the bight of the upper rear end of the mounting element.

4. The implement set forth in claim 3 wherein the coil spring means abuts against the clamp means above the pivotal connection between the shank and mounting element whereby, upon upward deflection of the shank, the effective lever arm through which the spring means acts decreases as the spring force increases.

5. The implement set forth in claim 4 wherein the extreme rear end of the channel-shaped mounting element has a downwardly extending lip, and the lip, the legs of the channel-shaped mounting element and the angle between the upper rear end portion of the mounting element and the major portion of the mounting element form a guide for the upper end of the spring means.

6. The implement set forth in claim 4 wherein the clamp means includes fulcrum means for effectively abutting the lower end of the coil spring means, the fulcrum means permitting the lower end of the spring means to remain normal to the centerline of the spring means.

* * * * *